United States Patent [19]
Johnson et al.

[11] Patent Number: 6,154,565
[45] Date of Patent: Nov. 28, 2000

[54] AUTOMATIC RETRIEVAL PROCESS FOR MACHINE-PRINTED OR HANDWRITTEN TEXT ON A BACKGROUND, IN A MULTILEVEL DIGITAL IMAGE

[76] Inventors: Jeffrey Horace Johnson, 7 Hardwick Road - Woburn Sands, Bucks, MK17 8QH, Grande-Bretagne; Jean-Claude André Simon, 10, rue de l'Université, 75007 Paris, both of France

[21] Appl. No.: 09/172,392

[22] Filed: Oct. 14, 1998

[51] Int. Cl.[7] ........................................... G06K 9/00
[52] U.S. Cl. ............................... 382/187; 382/194
[58] Field of Search ........................ 382/187, 188, 382/189, 190, 191, 194, 186, 200, 272; 358/403, 462, 486, 497

[56] References Cited

U.S. PATENT DOCUMENTS

| | | | |
|---|---|---|---|
| 4,446,486 | 5/1984 | Itoh | 358/280 |
| 4,501,016 | 2/1985 | Persoon et al. | 382/272 |
| 4,586,089 | 4/1986 | Nakazato et al. | 358/282 |
| 4,903,316 | 2/1990 | Hongo et al. | 382/272 |

FOREIGN PATENT DOCUMENTS

| | | |
|---|---|---|
| 2 517 092 | 5/1983 | France . |
| WO 87/03118 | 5/1987 | WIPO . |
| WO 96/24114 | 8/1996 | WIPO . |

*Primary Examiner*—Bijan Tadayon
*Assistant Examiner*—Seyed Azarian
*Attorney, Agent, or Firm*—Piper Marbury Rudnick & Wolfe

[57] ABSTRACT

Systems and methods for frequency acquisition and channel tracking in a direct sequence code division multiple access system are described. Frequency estimates are prepared and refined, which estimates are also used in the channel tracking process.

10 Claims, 4 Drawing Sheets

AUTOMATIC RETRIEVAL PROCESS FOR MACHINE-PRINTED OR HANDWRITTEN TEXT ON A BACKGROUND, IN A MULTILEVEL DIGITAL IMAGE

TECHNICAL FIELD the present invention concerns an automatic retrieval process for machine-printed or handwritten text on a background, in a multilevel digital image. More exactly, it concerns a process for processing a digital image with N grey levels, where N is an integer greater than 2, which comprises, on the one hand, a previously machine-printed background and, on the other hand, data written on this background in print or in hand writing, so as to retrieve this data for the purpose of subsequent operations of automatic scanning and recognition.

The invention applies especially to the automatic capture of cheque amounts and will be more particularly described here in this application.

Nonetheless, more generally, the invention may be applied in numerous fields which use automatic document scanning for which the background is problematic, as for example in the field of cartography.

BACKGROUND OF THE INVENTION

As regards the automatic capture of cheque amounts, an essential operation consists in detecting and reading out automatically the amounts in figures and in machine-printed or handwritten letters on the cheques. The major difficulty with this operation stems from the fact that the pre-printed background of the cheques is generally complex and is not restored with the required quality by the image sensors currently in use which provide a binary image of the cheques to be scanned.

The problem consisting of eliminating the cheque background and reading out the amounts in figures and in letters in a binary image cannot therefore be resolved satisfactorily by a straightforward conventional technique of binarisation by thresholding, which would attribute to the "background" part pixels with a greyscale value above a previously selected fixed threshold, and to the "amount" part pixels with a greyscale value below this fixed threshold.

The application of conventional binarisation techniques by thresholding leads in fact to numerous errors of interpretation: figures of letters of amounts to be recognised may be mis-filtered as belonging to the pre-printed background of the cheque, and vice versa. Ambiguity between the background and the machine-printed or handwritten text is all the greater since it may be that, on the greyscale image on certain cheques, background pixels are darker than pixels corresponding to the image of the cheque amount.

The purpose of the present invention is to overcome the aforementioned drawbacks by offering adaptive thresholding, particularly adapted to the elimination of the background in images to be processed, and based on the detection of particular two-diminesional geometric configurations, likely to correspond to the machine-printed or handwritten text sought.

The invention may be used just as well to process an entire image, such as a whole cheque image, as to process a sub-image, a particular image field or, more generally, any image portion.

SUMMARY OF THE INVENTION

To this end, the present invention proposes an automatic retrieval process for machine-printed or handwritten text on a background, in a digital image with N grey levels, where N is an integer greater than 2, in accordance with which, for each group constituted by a scan-line or several contiguous scan-lines of pixels of the image:

(a) the greyscale value of each pixel is compared with the respective values of at least two other pixels belonging to a predetermined neighbourhood of this pixel, and the value of this pixel is accepted if at least two predetermined inequalities are satisfied by this comparison;

then, for each group of inequalities to be verified simultaneously:

(b) a histogram is established giving, for each grey level value between 0 and N−1, the number of pixels of that grey level accepted at the conclusion of the comparisons carried out in step (a);

(c) a threshold, S, is determined from the histogram, among the N grey level values;

(d) the pixels accepted are divided into a first category, for which the value is above S, and a second category, for which the value is below S;

(e) the rows of pixels of the image are scanned horizontally, and on each row horizontal runs are determined as contiguous sequence of pixels which have been classified as the second category in step (d); and the columns of the image are scanned, and on each column vertical runs of contiguous second-category pixels are determined, as defined in step (d);

(f) from the previously determined horizontal runs, vertical polygons, including a number $y_v$ of vertically connected horizontal runs, are found, and from the previously determined vertical runs, horizontal polygons, including a number $x_h$ of horizontally connected vertical runs, are found;

(g) when the total number $y_v$ of vertically connected horizontal runs is lower than a predetermined number $p_v$, or when the total number $x_h$ of horizontally connected vertical runs is lower than a predetermined number $p_h$, steps (d) to (f) are repeated with a modified threshold value S;

the said machine-printed or handwritten text being obtained in the form of the said found polygons.

In accordance with one particular version, in step (c), a histogram local maximum may be sought, the tangent to the histogram may be determined at an inflection point with an abscissa lower than the abscissa of this local maximum, the greyscale value situated at the intersection of the said tangent with the axis of the abscissas of the histogram may be selected as the threshold S.

As a variant, in step (c), two local histogram maxima may be sought, and, if need be, the greyscale value situated at the middle of the segment joining the abscissas of these two local maxima may be selected as the threshold S.

As a variant, in step (c), (c1) for each line is established a histogram such as that defined in step (b);

(c2) in each histogram H(g), where g, 0≦g<N, denotes the greyscale value, are determined all the greyscale values $g_o$ for which $H(g_o)=0$ and $H(g_o+1)>0$;

(c3) for each greyscale value, are added the number of values $g_o$ meeting conditions defined in step (c2) found in all histograms;

(c4) for the threshold S is selected the greyscale value for which the total obtained at the conclusion of step (c3) is maximum, excluding the choice S=0.

A variant of stage (c2) consists in determining, in each histogram H(g), the values $g_o$ for which $H(g_o-1) \geq H(g_o)$ and $H(g_o)<H(g_o+1)$.

The aforementioned group of contiguous lines may include 8 contiguous lines of the image, in particular if the image to be processed has been compressed in compliance with the JPEG standard.

Text strokes consisting of vertical lines are retrieved in the form of vertical polygons, and text strokes consisting of horizontal lines are retrieved in the form of horizontal polygons.

To the same end as indicated above, the present invention also offers a variant of the previous process, in the form of an automatic retrieval process for machine-printed or handwritten text on a background, in a digital image with N grey levels, where N is an integer greater than 2, in accordance with which, for each group constituted by a line or several contiguous lines of pixels of the image:

(a1) the greyscale value of each pixel is compared with the respective values of at least two other pixels, and the values of the pixels which, after comparison, verify simultaneously at least two predetermined inequalities are accepted, e.g. $g(x-1,y) \geq g(x,y) \geq g(x+1,y)$;

(b1) the said group constituted by one line or several lines of the image is scanned horzontally, and vertically respectively, and on each line, and each column respectively, are determined horizontal, and vertical respectively, gradient runs, as being groups of horizontally, and vertically respectively, contiguous pixels, and which have been accepted at the conclusion of the comparisons carried out in step (a1);

(c1) for each gradient run determined at the conclusion of step (b1), the difference between the maximum greyscale value and the minimum greyscale value of the pixels of the said gradient run is calculated; and the value of the said difference is associated with the said gradient run;

(d1) a histogram is established giving, for each of the N×N pairs defined by (i) a greyscale value between 0 and N−1, and (ii) a value, between 0 and N−1, of the said differences calculated in step (c1), the number of pixels belonging to a gradient run and whose greyscale value and the value of the difference associated with the said gradient run are respectively equal to the greyscale value in the said pair and to the value of the difference in the said pair;

(e1) from the histogram, is determined, among the N values of the said differences, a threshold dg0;

(f1) the said machine-printed or handwritten text is retrieved in the form of pixels belonging to gradient runs, the value of the associated difference of which is above the said threshold dg0.

This variant of the process enables the probability of correct discrimination between the background and the machine-printed or handwritten text to be improved.

In one particular version, in step (a), and (a1) respectively, of the process above, a test is carried out to see whether the following pairs of inequalities are verified:

| | | | | | |
|---|---|---|---|---|---|
| (i) | g(x, y) ⓧ g(x − 1, y) | and | g(x + 1, y) | ⓧ g(x, y) |
| (ii) | g(x, y) ⓧ g(x, y − 1) | and | g(x, y + 1) | ⓧ g(x, y) |
| (iii) | g(x, y) ⓧ g(x − 1, y − 1) | and | g(x + 1, y + 1) | ⓧ g(x, y) |
| (iv) | g(x, y) ⓧ g(x + 1, y − 1) | and | g(x − 1, y + 1) | ⓧ g(x, y) |
| (v) | g(x, y) ⓧ g(x − 2, y) | and | g(x + 2, y) | ⓧ g(x, y) |
| (vi) | g(x, y) ⓧ g(x, y − 2) | and | g(x, y + 2) | ⓧ g(x, y) |
| (vii) | g(x, y) ⓧ g(x − 2, y − 2) | and | g(x + 2, y + 2) | ⓧ g(x, y) |
| (viii) | g(x, y) ⓧ g(x + 2, y − 2) | and | g(x − 2, y + 2) | ⓧ g(x, y) | where g(x,y) denotes the greyscale value of the pixel situated at the junction of the $y^{th}$ line and the $x^{th}$ column of the image, and where the sign ⓧ may be any one of the signs $\leq, <, \geq, >$.

BRIEF DESCRIPTION OF THE DRAWINGS

Other purposes and aspects of the present invention will emerge from reading the following detailed description of particular versions, given as non-restrictive examples. The description makes reference to the appended drawings in which.

DETAILED DESCRIPTION OF PREFERRED EMBODIMENTS

There follows a consideration of a digital image with N grey levels, where N is an integer greater than 2, called a multilevel digital image. For information only, N may=256. This image may have been obtained with the help of a traditional sensor, of the television camera, CCD bus or diode array type.

In the application of the present invention to the automatic entry of cheque amounts, it is a matter of a cheque image, comprising a pre-printed background and machine-printed of handwritten text on this background, which generally indicate the amount of the cheque in figures and in letters, the payee, the place and date of the cheque, and also the signature of the person making out the cheque.

For information only, since the average size of a cheque is 80×175 mm², and since the image is for example sampled at about 240 d.p.i. (i.e. 240 dots per inch), which is approximately equivalent to 8 to 10 pixels per mm, the size of the image is about 800×1750 pixels.

It is required to retrieve automatically these machine-printed or handwritten text, and more particularly to retrieve their constituent vertical, horizontal and oblique lines.

For this, a group of contiguous L lines of pixels of the image is considered, where L is an integer greater than or equal to 1 and all processes are carried out on this group of L lines.

As a non-restrictive example, if the image is coded according to the JPEG standard, groups of L=8 lines are considered.

During a first step, different neighbourhoods of a given central pixel are defined. In one particular version, eight neighbourhoods are defined each including two pixels in addition to the central pixel. These neighbourhoods are illustrated by FIGS. 2A to 2H, where each pixel is shown by a square.

As a variant, neighbourhoods including more than two pixels in addition to the central pixel can be defined.

It is noted that g(x,y) is the greyscale value of the pixel situated at the junction of the $y^{th}$ line and the $x^{th}$ column of the image. As a non-restrictive example, it is possible to select a scale of levels of grey such as the lighter a pixel is, the greater its value g.

For each pixel of the group of L lines of the image to be processed, a determined neighbourhood is considered and the greyscale value of the central pixel is compared with the greyscale values of its two neighbours.

Figure 2A:
FIGS 2A to 2H illustrate the different types of neighbourhoods considered in step (a) of the process in compliance with the present invention, in one particular version.

The neighbourhood shown in FIG. 2A includes a central pixel and its immediate neighbours to left and right. On the one hand, g(x,y) is compared with g(x−1,y), the greyscale value of the neighbouring left hand pixel, and on the other hand, with g(x+1,y) the greyscale value of the neighbouring right hand pixel. A test is carried out to see if the two following inequalities are verified simultaneously:

$$g(x, y) \otimes g(x-1, y) \text{ and } g(x+1, y) \otimes g(x, y)$$

where the sign $\otimes$ is a selected sign of inequality: $\leq$, $<$, $\geq$, or $>$. For example the sign $<$ may be selected, which amounts to testing if the three pixels considered have greyscale values diminishing from left to right, in other words get progressively darker from left to right.

The neighbourhoods shown in FIGS. 2B to 2H give rise to the verification of similar pairs of inequalities.

Figure 2B:

If a neighbourhood is considered such as shown in FIG. 2B, a test is carried out to see if the two following inequalities are verified simultaneously:

$$g(x, y) \otimes g(x, y-1) \text{ and } g(x, y) \otimes g(x, y+1)$$

Figure 2C:
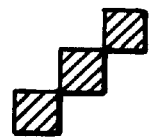

If a neighbourhood is considered such as shown in FIG. 2C, a test is carried out to see if the two following inequalities are verified simultaneously:

$$g(x, y) \otimes g(x-1, y-1) \text{ and } g(x, y) \otimes g(x+1, y+1)$$

Figure 2D:
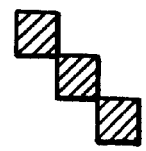

If a neighbourhood is considered such as shown in FIG. 2D, a test is carried out to see if the two following inequalities are verified simultaneously:

$$g(x, y) \otimes g(x+1, y-1) \text{ and } g(x, y) \otimes g(x-1, y+1)$$

Figure 2E:

If a neighbourhood is considered such as shown in FIG. 2E, a test is carried out to see if the two following inequalities are verified simultaneously:

$$g(x, y) \otimes g(x-2, y) \text{ and } g(x, y) \otimes g(x+2, y)$$

Figure 2F:

If a neighbourhood is considered such as shown in FIG. 2F, a test is carried out to see if the two following inequalities are verified simultaneously:

$$g(x, y) \otimes g(x, y-2) \text{ and } g(x, y) \otimes g(x, y+2)$$

Figure 2G:
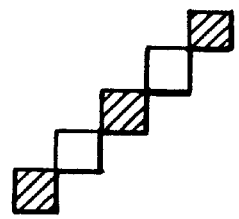

If a neighbourhood is considered such as shown in FIG. 2G, a test is carried out to see if the two following inequalities are verified simultaneously:

$$g(x, y) \otimes g(x-2, y-2) \text{ and } g(x, y) \otimes g(x+2, y+2)$$

Figure 2H:
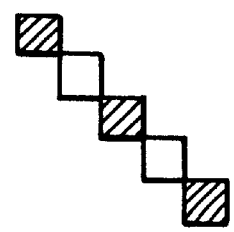

If a neighbourhood is considered such as shown in FIG. 2H, a test is carried out to see if the two following inequalities are verified simultaneously:

$$g(x, y) \otimes g(x+2, y-2) \text{ and } g(x, y) \otimes g(x-2, y+2)$$

Pixels verifying a pair of inequalities among those preceding are accepted. These pixels are called "differential pixels".

Figure 1:
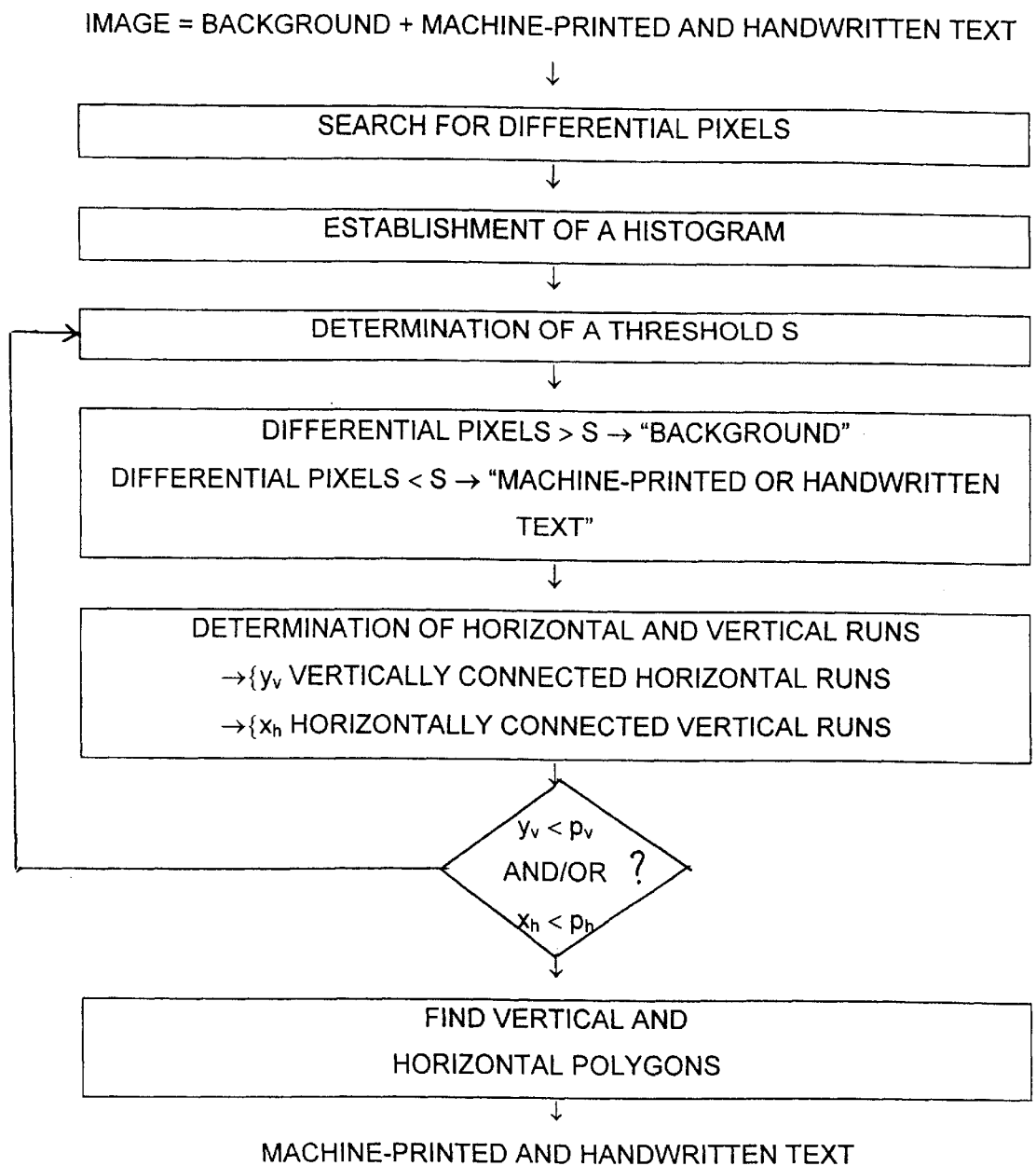
FIG. 1 is a flowchart of the process in compliance with the present invention.

In the particular version of FIG. 1, for a group of differential pixels satisfying a given pair of inequalities, a histogram is established bearing, as an abscissa, the grey scale values g, and as an ordinate, the corresponding number of differential pixels.

Figure 3:
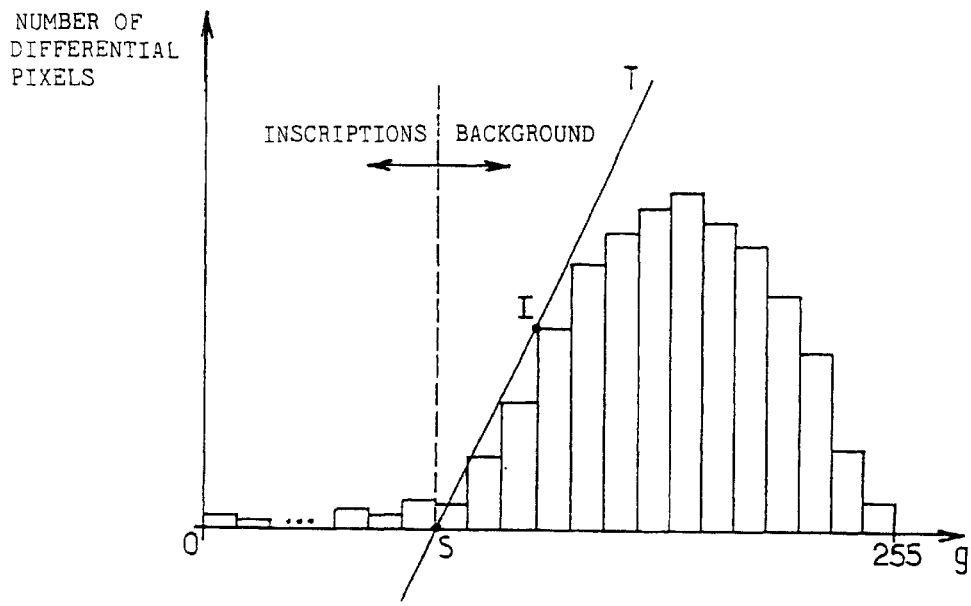
FIG. 3 shows a histogram example likely to be obtained at the conclusion of step (b) of the process in compliance with the present invention, in one particular version.

It is observed that such a histogram comprises one or more local maxima. FIG. 3 shows, as a non-restrictive example, a histogram of arbitrary shape, established for N=256 greyscale and comprising a maximum. Hereafter, this histogram is called one-dimensional.

The following step of the process of the invention, in the particular version of FIG. 1, consists in determining, from the histogram, a threshold S greyscale value, below which the differential pixels will be considered as likely to belong to the machine-printed or handwritten text and above which the differential pixels will be considered as likely to belong to the background of the image.

This decision threshold S may be determined in several ways.

In particular version illustrated by FIG. 3, the tangent T to the histogram is determined at an inflection point of the histogram situated to the left of the maximum, i.e. with an abscissa lower than the abscissa of the maximum. The tangent T cuts the axis of the abscissas at a point S, the greyscale value of which is selected as the threshold.

As a variant, two local maxima of the histogram may be sought. If they exist, the middle of the segment joining the abscissas of the two maxima may be selected as the threshold value S.

Another variant to determine the threshold S consists, in step (c), in establishing first of all a histogram of the differential pixels of each scan-line, denoted H(g), where g denotes the greyscale value, $0 \leq g < N$. Then, in each histogram, is determined a particular type of configuration; a greyscale $g_o$ value for which $H(g_o)=0$ and $H(g_o+1)>0$. There may be several $g_o$ values for each line.

One variant consists in determining the $g_o$ values for which $H(g_o-1) \geq H(g_o)$ and $H(g_o)<H(g_o+1)$. This variant generalises the previous case.

Next, for each greyscale value, the number of $g_o$ values found in all the histograms are added. For this, extreme greyscale values are disregarded, for example, 0, 1, 2, and 13, 14, 15 for 16 greyscale values, since these values may produce deviant dots.

The greyscale value for which the number of $g_o$ values is highest is selected as the threshold S.

The following step of the process consists in seeking, among the differential pixels for groups of contiguous pixels, horizontally and vertically.

By horizontal scanning, groups including at least 2 horizontally contiguous differential pixels, called "horizontal runs", can be determined, and by vertical scanning, groups including at least 2 vertically contiguous differential pixels, called "vertical runs", can be determined.

Next, groups of horizontally connected vertical runs are sought. These configurations, called "horizontal polygons", are likely to correspond to horizontal lines constituting the machine-printed or handwritten text to be read.

In the same way groups of vertically connected horizontal runs, called "vertical polygons", are sought.

Figure 4:
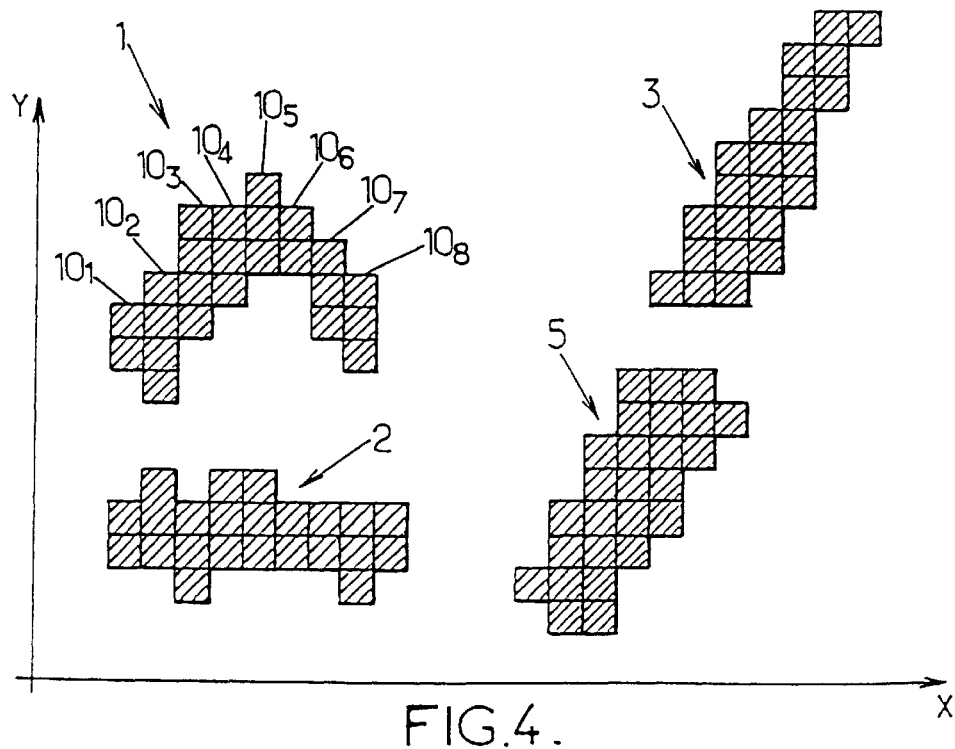
FIG. 4 shows diagrammatically four polygons of arbitrary shape, likely to be obtained at the conclusion of step (e) of the process in compliance with the present invention, in one particular version.

FIG. 4 gives the appearance of a group 1 of vertical runs covering a curve. The group 1 is made up of 8 vertical runs from $10_1$, to $10_8$.

It can be seen in FIG. 4 that the pixels of two adjacent runs of polygon 1 are situated in adjacent columns of the image. This illustrates the connectivity of the runs, a necessary requirement for membership of a polygon.

FIG. 4 also gives the appearance of a horizontal polygon 2 covering a horizontal line. It can be seen that the runs forming a polygon are not necessarily of equal size.

FIG. 4 further gives the appearance of two vertical polygons 3 and 5, formed of 9 horizontal runs and 8 horizontal runs respectively.

It may be that the number $y_v$ of horizontal runs found forming a polygon is insufficient to retrieve the full height of a vertical line. In this case several disconnected polygons are obtained, such as polygons 3 and 5 in FIG. 4.

The same situation may occur for the number $x_h$ of vertical runs.

This means that the previously selected decision threshold S is not judicious.

A number $p_v$ of vertically connected horizontal runs required to form a vertical polygon deemed of sufficient height is determined. The choice of $p_v$ is a function of the average expected width of the vertical polygons, and of the number of lines tolerated between two disconnected vertical polygons likely to cover a same vertical line.

In the same way, a number $p_h$ of horizontally connected vertical runs required to form a horizontal polygon deemed of sufficient length is determined. In a similar way, the choice of $p_h$ is a function of the average expected height of the horizontal polygons, and of the number of columns tolerated between two disconnected horizontal polygons likely to cover a same horizontal line.

If $y_v<p_v$ and/or if $x_h<p_h$, the threshold S value is modified, for example, by increasing it by one unit, and the steps of classification of differential pixels, determination of runs and search for polygons are repeated.

Adapting the threshold S can thus produce vertical polygons covering the full height of vertical lines and horizontal polygons covering the full length of horizontal lines.

Figure 5:
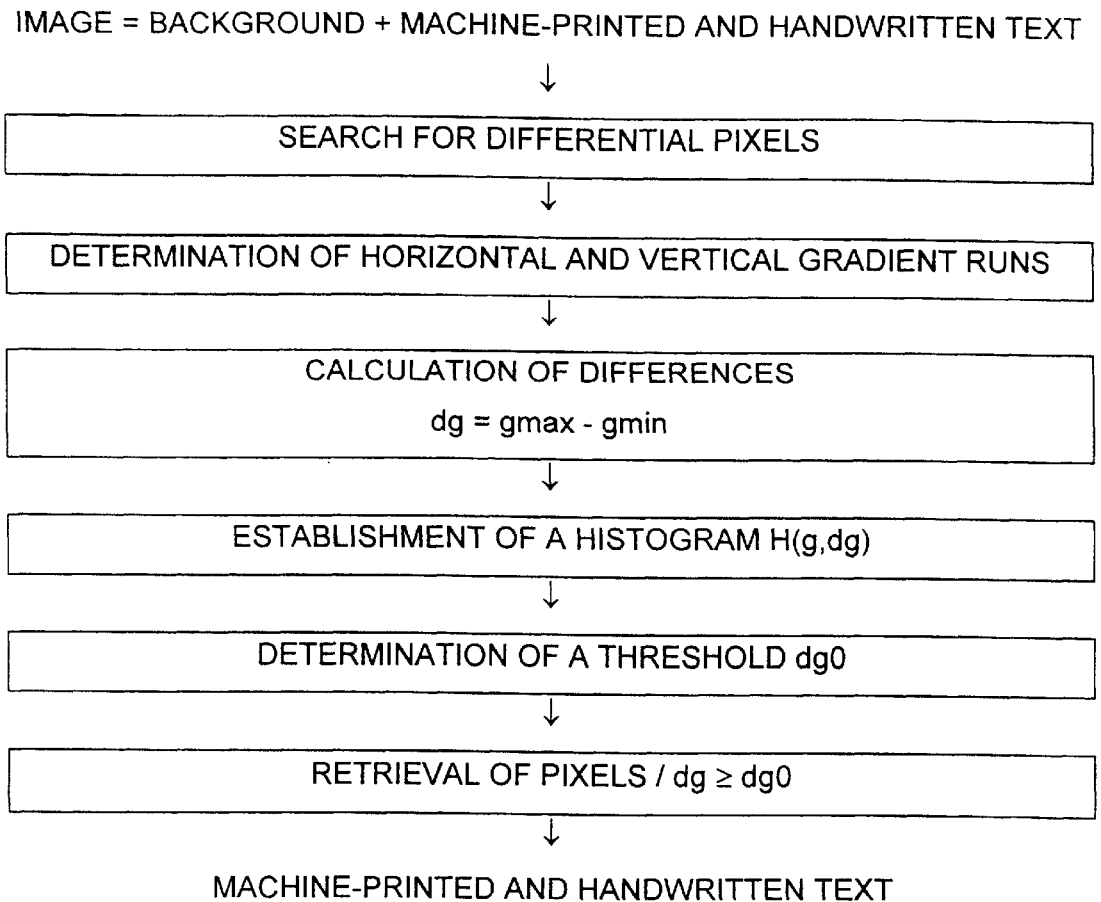
FIG. 5 is a flowchart of the process in compliance with the present invention, in a version variant.
Figure 6:
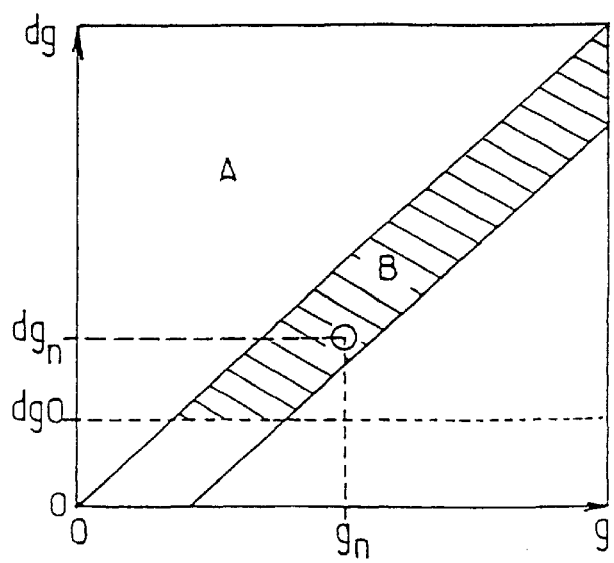
FIG. 6 shows a simplified projection, in the plane of coordinates (g,dg) defined below, of a histogram comprising a threshold dg0, likely to be obtained at the conclusion of step (e1) of the process in compliance with the present invention, in the version variant of FIG. 5.

Hereafter, with the help of FIGS. 5 and 6, a variant of a version of the process of the invention is described which enables a better discrimination between background and machine-printed or handwritten text. This variant therefore brings an improvement compared with the version previously described, especially in the case where the one-dimensional histogram defined above has more than two local maxima, or again one or more ambiguous areas, i.e. which are likely to correspond, either to lines sought, or to background to be eliminated.

In this case, the decision can be made with the help of a two-dimensional histogram, i.e. one established from two base variables, one of which is the greyscale value g already used to establish the one-dimensional histogram of the previous version, and the other is a difference, denoted dg, determined in the way described below.

As FIG. 5 shows, the first step of the process, in this version variant, is identical to the first step in the particular version previously described. This step of differential pixel retrieval will not therefore be described again here.

The following step consists in determining particular groups of pixels, called horizontal and vertical "gradient runs".

The definition of "runs" given in relation to the particular previous version, can be generalised as follows. In horizontal scanning, and vertical scanning respectively, of the image or of the image area to be processed, a "run" is a group of horizontally, and vertically respectively, contiguous pixels with the same property P. For example, the property P may be $g(x,y) \geq T$, where T is a threshold.

A "gradient run" is now defined as a run for which the property P, satisfied by all the pixels of this run, is one of the pairs of inequalities tested in the context of the particular previous version. In particular, the property P of horizontal "negative gradient" can be defined, as a non-restrictive example, by the property $g(x,y) \geq g(x+1,y)$, or, to overcome possible noise in the greyscale pixel $g(x+1,y)$, by the property $g(x,y) \geq g(x+2,y)$, verified by all the pixels of co-ordinates (x,y) of the gradient run, except for the pixel situated the right hand end of the gradient run.

In a similar way a "positive gradient" run can be defined by changing the sign of the inequalities.

The following step consists, as FIG. 5 shows, in calculating, for each previously determined gradient run, the difference, denoted dg, between the maximum greyscale value gmax and the minimum greyscale value gmin of the pixels of this gradient run, i.e. dg=gmax−gmin. With each gradient run is associated a dg value.

Whether the property of the gradient runs considered is a positive or negative gradient, there is always $dg \geq 0$. Moreover, if the greyscale g can take N values, the difference dg can also take N values.

Next a two-dimensional histogram H(g,dg) is established, on the basis of two variables g and dg. From what has been said before, it can be seen that the plane of co-ordinates (g,dg) of this histogram comprises N×N dots. With each dot $(g_n, dg_n)$ of this plane, is associated all the pixels belonging to a gradient run and whose greyscale value g(x,y) and difference value (dg) associated with this gradient run are equal to $g_n$ and $dg_n$ respectively, i.e. $g(x,y)=g_n$ and $dg=dg_n$.

FIG. 6 illustrates the simplified projection of H(g,dg) in the plane (g,dg). Out of concern for clarity, the pixels associated with each dot $(g_n, dg_n)$ have not been shown. The pixels associated with one dot $(g_n, dg_n)$ of the histogram have only been symbolised by a circle situated at the intersection of the straight lines parallel to the axes and coming from the abscissa $g_n$ and the ordinate $dg_n$ respectively.

The area A situated above the main diagonal of the plane (g,dg) is empty; the area where the pixels corresponding to lines are found is the complementary area of A.

As FIG. 5 shows, the following step consists in determining, from the histogram H(g,dg), a decision threshold dg0 among the N values of the differences dg. The threshold dg0 is defined in such a way that the pixels associated with dots $(g_n, dg_n)$ of the histogram such as dg<dg0, i.e. dots situated below the threshold dg0 in the plane (g,dg), are considered as belonging to the background, and the pixels associated with dots of the histogram situated above the threshold dg0 are considered as belonging to the text strokes or machine-printed or handwritten text sought.

To determine the threshold dg0, techniques similar to those used to determine the threshold S in the previous version can be used.

In most cases, the pixels corresponding to the lines sought are found in a area B shown by hatching in FIG. 6. The area B is neighbouring and below the main diagonal of the plane (g,dg).

Once the machine-printed and handwritten text has been retrieved in compliance with the process of the invention, the pixels retrieved can be subjected to a known process of form recognition, for example for the purpose of automatically capturing the amount carried on the processed cheque, in the example applying to the automatic recognition of a cheque amount.

The processed image can also be recompressed.

Let gmin and gmax be the minimum and maximum greyscale values of a gradient run. Then dg=gmin−gmax above. An alternative two-dimensional histogram, H(gmax, gmin) can be formed. This conveys the same information as H(g,dg) in a different and sometimes useful form.

We claim:

1. A process for the automatic retrieval of machine-printed or handwritten text over a background, in a digital image with N grey levels, where N is an integer greater that 2, in accordance with which, for each group constituted by a line or several contiguous lines of pixels of the image:
   (a) the greyscale value of each pixel is compared with the respective values of at least two other pixels belonging to a predetermined neighbourhood of this pixel, and the values of the pixels which, after comparison, satisfy simultaneously at least two predetermined inequalities are retained;
   then, for each group of inequalities to be verified simultaneously:
   (b) a histogram is established giving, for each greyscale value between 0 and N−1, the number of pixels accepted at the conclusion of the comparisons carried out in step (a);
   (c) from the histogram is determined, among the N greyscale values, a threshold S;
   (d) the pixels accepted are divided into a first category, for which the value is above S, and a second category, for which the value is below S;
   (e) the said group constituted b one or more lines of the image is scanned horizontally, and vertically respectively, and on each line, and each column respectively, are determined horizontal, and vertical respectively, runs, as being groups of contiguous pixels horizontally, and vertically respectively, and which have been classified in step (d0 in the second category;
   (f) among the previously determined horizontal, and vertical respectively, runs, vertical polygons are read, including a number $y_v$ of vertically connected horizontal runs, and horizontal polygons, including a number $x_h$ of horizontally connected vertical runs;
   (g) when the total number $y_v$ of vertically connected horizontal runs is lower than a predetermined number $p_v$, or when the total number $x_h$ of horizontally connected vertical runs is lower than a predetermined number $p_h$, steps (d) to (f) are repeated with a modified threshold value S;
   the said machine-printed or handwritten text being obtained in the form of the said retrieved polygons.

2. A process in accordance with claim 1, wherein, in step (c), a histogram local maximum is sought, the tangent to the histogram is determined at an inflection point with an abscissa lower than the abscissa of this local maximum, and the greyscale value situated at the intersection of the said tangent with the axis of the abscissas of the histogram is selected as the threshold S.

3. A process in accordance with claim 1, wherein, in step (c), two local histogram maxima are sought, and, if need be, the greyscale value situated at the middle of the segment joining the abscissas of these two local maxima is selected as the threshold S.

4. A process in accordance with claim 1, wherein, in step (c),
   (c1) for each line is established a histogram such as that defined in step (b);
   (c2) in each histogram H(g), where g, $0 \leq g < N$, denotes the greyscale value, are determined all the greyscale values $g_o$ for which $H(g_o)=0$ and $H(g_o+1)>0$;
   (c3) for each greyscale value, are added the number of values $g_o$ meeting conditions defined in step (c2) found in all histograms;
   (c4) for a threshold S is chosen the greyscale value for which the total obtained at the conclusion of step (c3) is maximum.

5. A process in accordance with claim 1, wherein, in step (c),
   (c1) for each line is established a histogram such as that defined in step (b);
   (c2) in each histogram H(g), where g, $0 \leq g < N$, denotes the greyscale value, are determined all the greyscale values $g_o$ for which $H(g_o-1) \geq H(g_o)$ and $H(g_o) < H(g_o+1)$;
   (c3) for each greyscale value, are added the number of values $g_o$ meeting conditions defined in step (c2) found in all histograms;
   (c4) for a threshold S is chosen the greyscale value for which the total obtained at the conclusion of step (c3) is maximum.

6. A process in accordance with claim 1, wherein steps (a) to (f) are carried out for each group of 8 contiguous lines of the image.

7. A process in accordance with claim 1, wherein machine-printed and handwritten text is retrieved consisting of vertical, and horizontal respectively lines, in the form of vertical, and horizontal respectively, polygons.

8. A process for the automatic retrieval of machine-printed or handwritten text over a background, in a digital image with N grey levels, where N is an integer greater that 2, in accordance with which, for each group constituted by a line or several contiguous lines of pixels of the image:
   (a1) the greyscale value of each pixel is compared with the respective values of at least two other pixels, and the values of the pixels which, after comparison, verify simultaneously at least two predetermined inequalities are accepted;
   (b1) the said group constituted by one or more lines of the image is scanned horizontally, and vertically respectively and on each line, and each column respectively, are determined horizontal, and vertical respectively, gradient runs, as being groups of contiguous pixels horizontally, and vertically respectively, and which have been accepted at the conclusion of the comparisons carried out in step (a1);
   (c1) for each gradient run determined at the conclusion of step (b1), the difference between the maximum greyscale value and the minimum greyscale value of the pixels of the said gradient run is calculated; and the value of the said difference is associated with the said gradient run;
   (d1) a histogram is established giving, for each of the N×N pairs defined by (i) a greyscale value between 0 and N−1, and (ii) a value, between 0 and N−1, of the said differences calculated in step (c1), the number of pixels belonging to a gradient run and whose greyscale value and the value of the difference associated with the said gradient run are equal to the greyscale value in the said pair and to the value of the difference in the said pair respectively;

(e1) from the histogram, is determined, among the N values of the said differences, a threshold $dg0$;

(f1) the said machine-printed or handwritten text is retrieved in the form of pixels belonging to gradient runs, the value of the associated difference of which is above the said threshold $dg0$.

9. A process in accordance with claim 1, wherein, in step (a), tests are conducted to see if the following pairs of inequalities are verified:

| (i) | $g(x, y) \; \textcircled{x} \; g(x - 1, y)$ | and | $g(x + 1, y) \; \textcircled{x} \; g(x, y)$ |
|---|---|---|---|
| (ii) | $g(x, y) \; \textcircled{x} \; g(x, y - 1)$ | and | $g(x, y + 1) \; \textcircled{x} \; g(x, y)$ |
| (iii) | $g(x, y) \; \textcircled{x} \; g(x - 1, y - 1)$ | and | $g(x + 1, y + 1) \; \textcircled{x} \; g(x, y)$ |
| (iv) | $g(x, y) \; \textcircled{x} \; g(x + 1, y - 1)$ | and | $g(x - 1, y + 1) \; \textcircled{x} \; g(x, y)$ |
| (v) | $g(x, y) \; \textcircled{x} \; g(x - 2, y)$ | and | $g(x + 2, y) \; \textcircled{x} \; g(x, y)$ |
| (vi) | $g(x, y) \; \textcircled{x} \; g(x, y - 2)$ | and | $g(x, y + 2) \; \textcircled{x} \; g(x, y)$ |
| (vii) | $g(x, y) \; \textcircled{x} \; g(x - 2, y - 2)$ | and | $g(x + 2, y + 2) \; \textcircled{x} \; g(x, y)$ |
| (viii) | $g(x, y) \; \textcircled{x} \; g(x + 2, y - 2)$ | and | $g(x - 2, y + 2) \; \textcircled{x} \; g(x, y)$ | where $g(x,y)$ denotes the greyscale value of the pixel situated at the junction of the $y^{th}$ line and the $x^{th}$ column of the image, and where the sign $\textcircled{x}$ may be any one of the signs $\leq, <, \geq, >$.

10. A process in accordance with claim 8, wherein, in step (a1), tests are conducted to see if the following pairs of inequalities are verified:

| (i) | $g(x, y) \; \textcircled{x} \; g(x - 1, y)$ | and | $g(x + 1, y) \; \textcircled{x} \; g(x, y)$ |
|---|---|---|---|
| (ii) | $g(x, y) \; \textcircled{x} \; g(x, y - 1)$ | and | $g(x, y + 1) \; \textcircled{x} \; g(x, y)$ |
| (iii) | $g(x, y) \; \textcircled{x} \; g(x - 1, y - 1)$ | and | $g(x + 1, y + 1) \; \textcircled{x} \; g(x, y)$ |
| (iv) | $g(x, y) \; \textcircled{x} \; g(x + 1, y - 1)$ | and | $g(x - 1, y + 1) \; \textcircled{x} \; g(x, y)$ |
| (v) | $g(x, y) \; \textcircled{x} \; g(x - 2, y)$ | and | $g(x + 2, y) \; \textcircled{x} \; g(x, y)$ |
| (vi) | $g(x, y) \; \textcircled{x} \; g(x, y - 2)$ | and | $g(x, y + 2) \; \textcircled{x} \; g(x, y)$ |
| (vii) | $g(x, y) \; \textcircled{x} \; g(x - 2, y - 2)$ | and | $g(x + 2, y + 2) \; \textcircled{x} \; g(x, y)$ |
| (viii) | $g(x, y) \; \textcircled{x} \; g(x + 2, y - 2)$ | and | $g(x - 2, y + 2) \; \textcircled{x} \; g(x, y)$ | where $g(x,y)$ denotes the greyscale value of the pixel situated at the junction of the $y^{th}$ line and the $x^{th}$ column of the image, and where the sign $\textcircled{x}$ may be any one of the signs $\leq, <, \geq, >$.

\* \* \* \* \*